Figure 1:
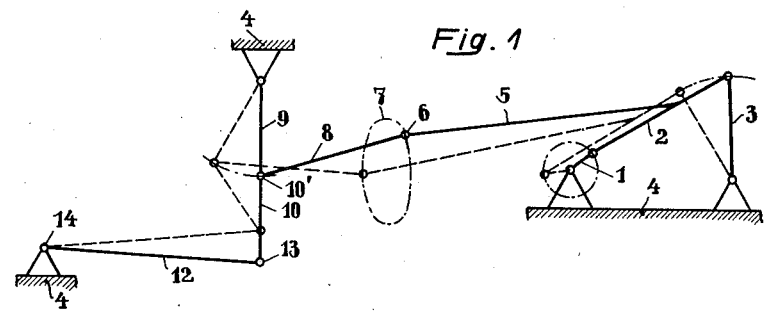

Aug. 31, 1943.    W. E. H. KRZENCIESSA ET AL    2,328,466
MECHANISM FOR CONTROLLING MOVEMENTS
Filed July 28, 1939    2 Sheets-Sheet 1

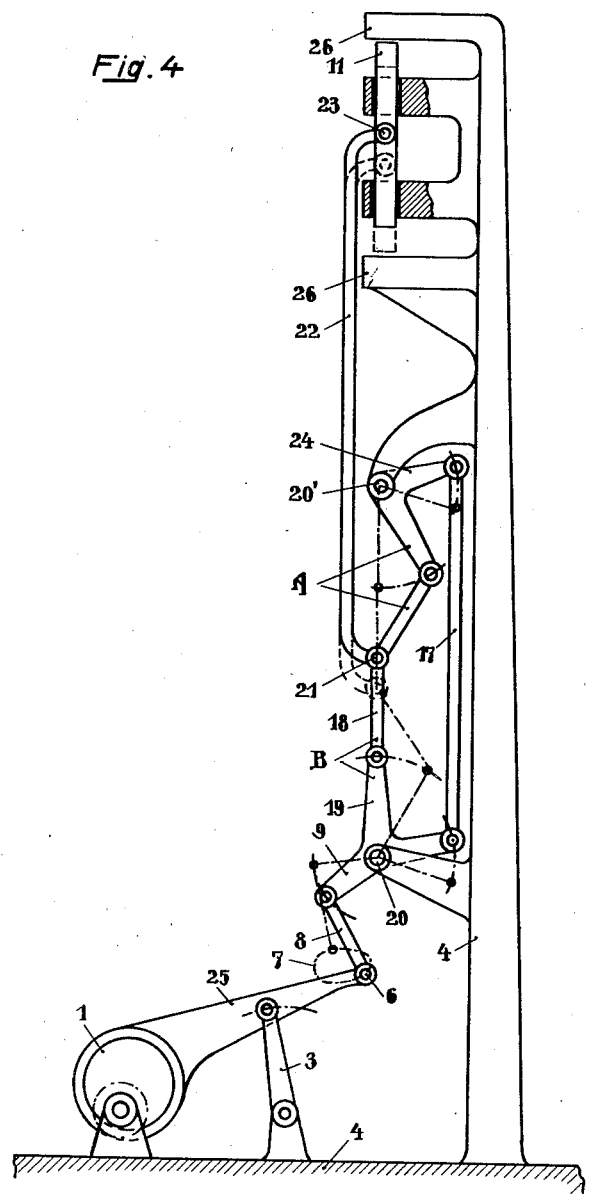

Patented Aug. 31, 1943

2,328,466

UNITED STATES PATENT OFFICE 2,328,466

MECHANISM FOR CONTROLLING MOVEMENTS

Walter Erich Herbert Krzenciessa, Kurt Gustav Scheibel, and Arthur Albrecht Bohmann, Dresden, Germany; vested in the Alien Property Custodian Application July 28, 1939, Serial No. 287,162
In Germany September 3, 1936

5 Claims. (Cl. 74—40)

For driving machines and parts of machines mechanisms are known which generate coupler curves, the part of the mechanism generating the coupler curves being connected by a link with the part of the machine to be controlled. As the simplest form of mechanism the quadric crank-chain is employed, the coupler of which makes the most varied movements. The invention relates to a particular arrangement of such a mechanism. Useful constructions of such mechanisms have hitherto not been produced for use with high speeds of rotation and with transmission of high powers. The reason for this is that even with very exact construction of the driving members play occurs in the links at high speeds of rotation, the large forces developed moreover producing rapid wear.

These disadvantages are avoided by the invention by actuating the intermediate mechanism mounted on the machine frame from a point of a coupler which is so arranged as a lock mechanism that the resistances of the driven member connected to the intermediate mechanism are made ineffective for the coupler mechanism in one or more positions and are transmitted to the machine frame.

The part of the mechanism generating the coupler curve is connected with its link not directly to the part of the machine to be controlled but to an interposed mechanism which takes up the resistances without transmitting them to the coupler mechanism when a point of rest occurs in the drive.

The intermediate mechanism should preferably consist of a toggle lever mechanism, a supporting link of the mechanism being located at a stationary part of the machine. As soon as the toggle lever mechanism moves into the dead point position the whole drive is relieved and the lack of precision which has developed in the coupler mechanism as well as the forces arising are intercepted by the toggle mechanism and corrected.

When the link connected to the coupler in known manner is exactly or approximately suited to the radius of curvature of a part of the curve then during part of the movement of the coupler a point of rest occurs. This rest is still further improved by the toggle lever moving into the dead point position, so that a point of rest of extreme precision is produced.

Moreover it is desirable to bring the machine part controlled by the coupler curve mechanism twice to rest and in exactly prescribed position. In order to attain this result in accordance with the invention two toggle levers are disposed in series in such manner that in the end positions one toggle lever is always in the dead point position and the other in the collapsed position. The two toggle levers are thus positively moved by a common drive.

Figure 2:
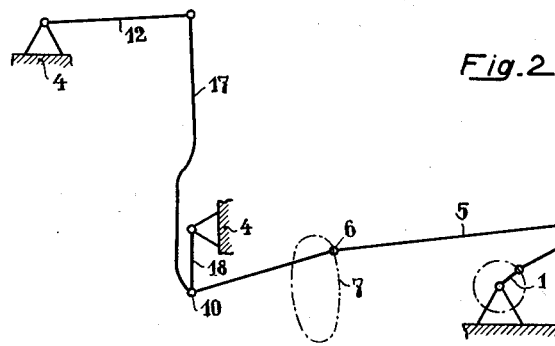
Figure 3:
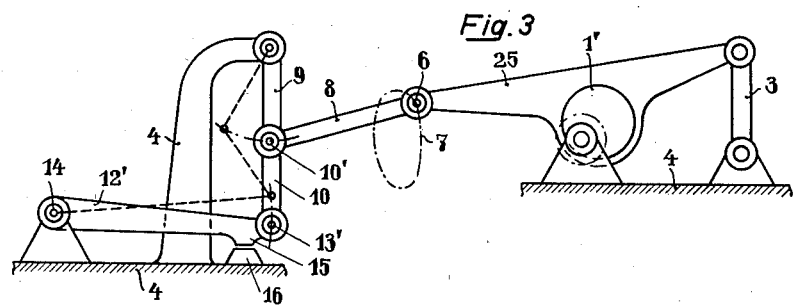
Figure 5:
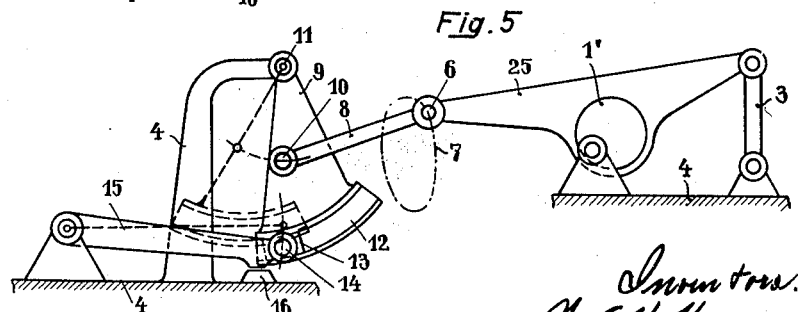

In the accompanying drawings Fig. 1 shows a diagram of a mechanism in which the toggle lever mechanism is extended into the dead point position; Fig. 2 shows another embodiment; Fig. 3 is an example of a construction according to Fig. 1. Fig. 4 is a construction with the two toggle levers arranged in series. Fig. 5 illustrates a still further embodiment.

The mechanism generating the coupler curve consists of the crank 1, coupler 2, the lever 3 and the machine frame 4.

With the coupler 2 is rigidly connected a coupler arm 5 which outside of the coupler straight lines generates in the coupler point 6 a curve 7 when the crank rotates. To the point 6 is pivoted a rod 8 which is connected to the arm 9 at the pivot 10'. The arm 9 is mounted on the frame 4. To the pivot 10' is also pivoted a second arm 10 which is connected with the driven member 12 at 13. The driven member 12 can swing about the point 14 on the frame 4. One construction of this mechanism is shown by way of example in Fig. 3. The crank 1 is formed as an enlargement 1' of the pin. The coupler and coupler arm are embodied in the lever 25.

The driven member 12' is intended to attain for example with its projection 15 an exact terminal position to the bearing 16 of the frame 4. Even with a small crank 1 a comparatively large coupler curve 7 is generated by the coupling point 6. It is therefore necessary to reduce the size of the curve for the driven member.

In the embodiment illustrated the connecting member 5 is controlled by the curve which the movement transmits to the toggle mechanism 9, 10. The dimensions of these members can be so selected that a definite amount of movement is obtained at the driven member 12. The pivot of the arm 9, 10 lies between the outer ends of the arm. The construction shown in Fig. 2 can be selected in order to reduce the movement. In that arrangement the pivot lies on an extension of the connection of the outer ends of the arms 17 and 18. There is thus obtained a considerably smaller movement of the driven member 12. If a definite terminal position of the driven member is to be obtained it is necessary that the toggle mechanism 9, 10 or 17, 18 should be brought to its dead point position. The forces acting on the driven member 12 are thus taken up by the two arms 9 and 10 or 17 and 18. For this purpose one of the levers is mounted on the frame 4.

It is not only the forces which are taken up in the toggle mechanism. Also the vibrating movements which are produced at the coupling point 6 no longer have any influence on the driven member. As the forces of the driven member 12 act no longer directly on the coupling point, the pivots of the coupler mechanism are very much improved and relieved of stress.

If the driven member 12 is to be brought to rest exactly in the lower position then the point 6 need only move through an approximately arcuate path on the coupler curve 7 when the pivot 10' of the link 8 has moved into the extended position of the two controlling members 9, 10. Errors of 1 to 2 millimeters in the curve 7 are rendered ineffective by the extended position of the toggle lever mechanism 9, 10 because this small movement in the extended position exerts no influence on the driven member 12.

It is thus possible on the one hand to use a greater length of the couple curve for the point of rest and on the other hand by the dead points of the toggle lever mechanism 9, 10 or 17, 18 the period of rest can be extended by a considerable amount. If two points of rest are required the time of rest which is obtained by a part of the curve of which the length of the member 8 is not the radius of curvature are improved by the dead positions of the toggle link.

In Fig. 4 the crank 1 has been increased by an enlargement of the pin and forms with the coupler 25 and the lever 3 as well as the frame 4 a quadric crank-chain. The coupling point 6 lying outside of the couple describes a curve 7. The link 8 is connected to the coupling point 6 and transmits the movement to the operating arm 9 of a bell crank lever. The lever pivots about the pins 20 mounted on the frame 4. The mechanism consists thus so far of a six-membered couple mechanism. It is now required to provide in the reciprocating slide 11 of the machine a period of rest at exactly predetermined times and that changes in the amount of the movement and of the position should not exceed .1 mm. and that the precision should also subsist for years.

The slide 11 is mounted in slide blocks in the machine frame and is limited by the wall 26 of the machine in its movement at both sides.

The range of use for this reciprocating slide, lever or the like can be very great in most varied types of machines. For example the slide may be used to stamp a paper band running above or beneath it. It need not cooperate with counter surfaces when exact limitation of the movement which can be obtained in all types of machines is desired.

The problem can be solved by the present invention by interposing between the two supporting points 20, 20' of the frame two toggle levers A, B. In the central pivot 21 where the two toggles are connected with one another is mounted a transmitting rod 22 which at the other end is connected again by the pivot 23 with the slide 11. As both positions of movement of the slide 11 are to be limited the lower toggle lever B is in the dead point position while the upper toggle lever A is collapsed. The two levers of the toggle levers A, B mounted in the frame 4 are connected with one another by the connecting rod 17 in parallelogram fashion and are driven by the six-membered couple mechanism as is shown in the drawings. Obviously the two levers mounted in the frame can drive still others for example by a swinging toothed segment pair or two levers which engage one another like slide and slide block.

If now the slide 11 is in the upper position shown locking of the toggle takes place when the lower toggle lever B is in the dead point position and the point 23 on the slide 11 lies in a straight line with the pivot 21 and the points 20, 20'. In the lower position of the movement the same occurs when the points 23, 20' and 21 lie in a straight line. The upper toggle lever A is thus located in the dead point position shown in dotted lines while the lower toggle lever B is collapsed. Thus both positions are exactly limited, the six-membered mechanism being completely relieved of stress on passage through the dead point position of the toggle levers A, B. The great mass acceleration forces, vibrations and shocks (produced by the play in the bearings) which would otherwise occur in the end positions of the slide 11 are thus intercepted in the toggle levers and therewith in the frame itself. The link chain disposed in series and influencing the driven member consists thus in each case of only five members: slide 11, rod 22, driven link 18, driving lever 19 and the frame 4. For the other end position the corresponding remarks apply. This arrangement even in high speed machines which otherwise would have to overcome great forces operates satisfactorily in a way which cannot be obtained with any other periodically operating mechanism. By selection of the lengths of the levers 18, 19 in the toggle lever B or A changes of the time can be effected, for example by varying the lever arms to which the rod 8 is connected or varying the dimensions of the rod 17. Thus it is no longer necessary to maintain exactly the times on the curve but these times can be varied within definite limits by the succeeding toggle lever. This gives in the selection and the construction of the mechanism an economical arrangement. It is in fact possible by skillful selection of the toggle lever arrangement to obtain a new couple drive and thus to transmit a plurality of movements to a machine from a single coupler. It has been possible hitherto in the six-membered couple mechanism to fulfil these conditions but the constructions carried out made it clear that this was possible only within certain definite limits while it can be effected much easier and better by the associated toggle lever. This advantage of the coupler mechanism combined with the toggle lever produces also a simplification of the driving means. The constructions carried out have shown the surprising result that it is very often necessary to produce all movements in a machine if a point of rest is to occur by other means as well as by the six-membered coupler mechanism.

Although in the example shown the drive is effected by a coupler mechanism obviously other forms of drive may be used to actuate this double toggle mechanism. The driving lever 19 of the toggle B may for example also be actuated by a crank, a cam or another periodic driving mechanism. However, the coupler mechanism is that best suited for high speed machines. Even with cam drives a great improvement is obtained by transmitting great forces with this double toggle mechanism, because the forces are intercepted in the pivots and may accordingly be great. In this arrangement also the cam drive is relieved and wear on the cams considerably reduced.

Referring to the embodiment illustrated in Fig. 5 the mechanism generating the coupler curve consists of the eccentric-like crank 1' formed by an enlargement of the pin, the coupler 25, lever 3 and the frame 4. The coupling point 6 describes a curve 7 when the crank is rotating. A rod 8 is pivoted at the point 6 and connected with the pivot 10 on a lever 9 which is mounted to swing in the frame about the pivot 11. The lever has a slide 12 in the groove in which the slide block 13 slides. This block is connected with the pivot 14 with driven lever 15. The guide groove of lever 9 is of arcuate form, the centre lying beyond the pivot 11 of the lever 9. The guide track is thus disposed eccentrically in the lever so that on the swinging of the lever 9 into the dotted position the driven lever 15 is raised. The slide block or the driven lever 15 is thus raised and lowered by the wedge shaped surfaces on outward movement of the lever. The wedge angle is so arranged that the forces which act on the driven lever in the vertical direction are intercepted in the guide groove or in the pivot 11. The injurious forces may thus no longer act on the coupler mechanism. Obviously the slide 12 can be given other forms; for example the slide can be rectilinear or curved. The advantage of this arrangement lies in the fact that not only the one or other end movement but also every intermediate movement is intercepted in the guide or in the pivot 11 while at the pivot this is only possible at definite positions of the toggle mechanism. It is important that the guide track should be self locking in relation to the driven lever.

We claim,

1. A mechanism for transmitting controlled drive movements comprising two toggle levers arranged in series forming a drive connection at their common pivot, said toggle levers being so arranged that when one of them is in extended position the other is in broken position, a common drive for said toggle levers comprising a rod mechanism consisting of rigid link members controlling said toggle levers, and means for actuating said common drive including a pivot travelling along a curve for positively guiding said rod mechanism.

2. A mechanism as set forth in claim 1 in which said rod mechanism connecting the toggle levers comprises a link parallelogram connected to the toggle levers by levers fulcrumming on the fixed pivots of said toggle levers.

3. A mechannism as set forth in claim 1 in which the movement of said toggle levers is produced by a coupling drive arranged to actuate said travelling pivot.

4. A mechanism for transmitting controlled drive movements comprising a pair of toggle levers having a common pivot, means also connected to said common pivot for transmitting its movement, said toggle levers being so arranged that when one of them is in extended position the other is in broken position, means for driving said toggle levers comprising parallel lever arms fulcrummed on the fixed pivots of the respective toggle levers, a link pivotally connecting said lever arms, a third lever arm fulcrummed on the fixed pivot of one of said toggle levers, a thrust link pivotally connected to said third lever arm, and a coupling drive arranged to move one extremity of said thrust link in a desired curve.

5. A mechanism as set forth in claim 4 wherein the coupling drive comprises a coupler lever fulcrummed to the free end of a control lever, and having one arm pivoted to said thrust link, and a control lever pivoted at one extremity to a fixed member and at its other extremity to said coupler lever.

WALTER ERICH HERBERT
    KRZENCIESSA.
KURT GUSTAV SCHEIBEL.
ARTHUR ALBRECHT BOHMANN.